United States Patent
Durand et al.

(10) Patent No.: US 6,761,393 B2
(45) Date of Patent: Jul. 13, 2004

(54) HINGE SYSTEM FOR MOTOR VEHICLE BOOT LID COMPRISING AN ARTICULATED ARM AND A SLIDING ARM

(75) Inventors: David Durand, Paris (FR); Dominique Pastourel, Boissy sous Saint Yon (FR)

(73) Assignee: Renault S.A.S., Boulonge Billancourt (FR)

(*) Notice: Subject to any disclaimer, the term of this patent is extended or adjusted under 35 U.S.C. 154(b) by 0 days.

(21) Appl. No.: 10/182,910

(22) PCT Filed: Feb. 2, 2001

(86) PCT No.: PCT/FR01/00316
§ 371 (c)(1),
(2), (4) Date: Aug. 2, 2002

(87) PCT Pub. No.: WO01/56823
PCT Pub. Date: Aug. 9, 2001

(65) Prior Publication Data
US 2003/0009846 A1 Jan. 16, 2003

(30) Foreign Application Priority Data
Feb. 2, 2000 (FR) .......................... 00 01316

(51) Int. Cl.$^7$ ................................. B60J 5/10
(52) U.S. Cl. ............. 296/146.8; 296/76; 296/106; 49/213

(58) Field of Search ................ 296/76, 146.4, 296/146.8, 146.12, 106, 50; 49/213, 215

(56) References Cited

U.S. PATENT DOCUMENTS 5,398,988 A  *  3/1995  DeRees et al. ............. 296/155

FOREIGN PATENT DOCUMENTS

| DE | 11 16 986 | 11/1961 | | |
|----|-----------|---------|---|---|
| DE | 44 03 126 | 8/1995 | | |
| EP | 0 401 081 | 12/1990 | | |
| GB | 799 932 | 8/1958 | | |
| JP | 361271120 | * | 12/1986 | ............. 296/146.8 |
| JP | 406227256 | * | 8/1994 | ............. 296/146.4 |

* cited by examiner

*Primary Examiner*—Dennis H. Pedder
(74) *Attorney, Agent, or Firm*—Oblon, Spivak, McClelland, Maier & Neustadt, P.C.

(57) ABSTRACT

A motor vehicle trunk door articulated to the ends of a first arm mounted pivoting, at its other end, about a vertical lateral pin integral with a body. The truck door moves from a closing position towards an opening position, substantially perpendicular to the closing position, by the first arm having a curved shape, and a second arm. One of the ends of the second arm is secured to the trunk door and the other end is mounted pivoting on a sliding sleeve mounted on a guide rail.

2 Claims, 2 Drawing Sheets

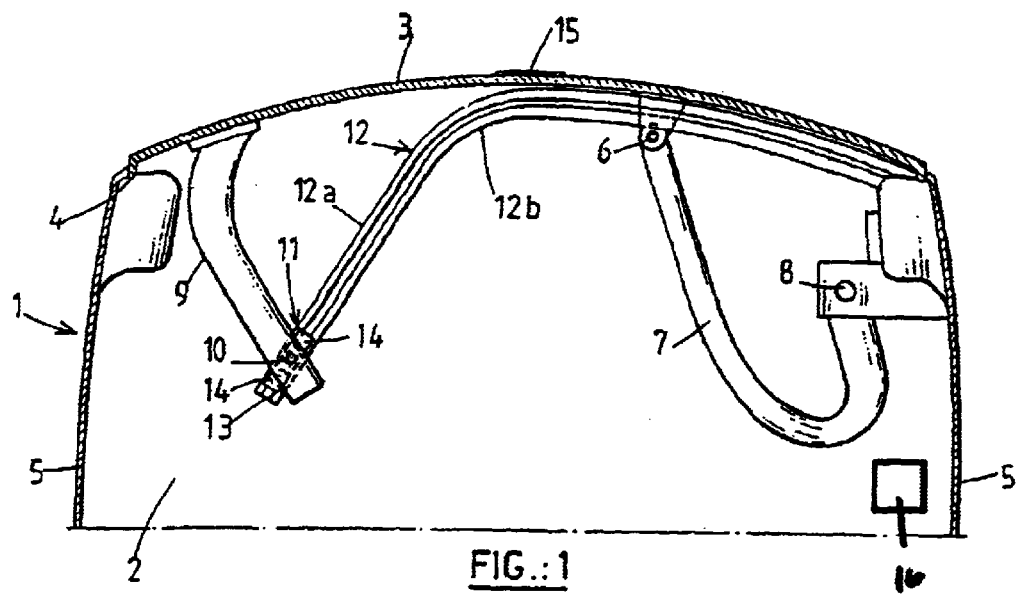
FIG.: 1
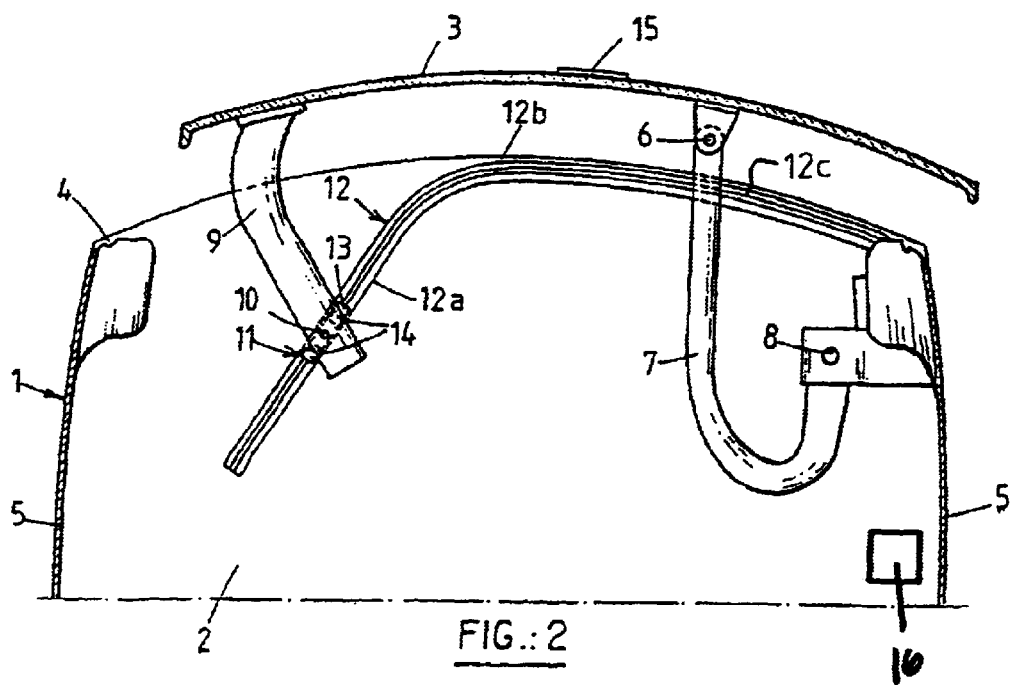
FIG.: 2

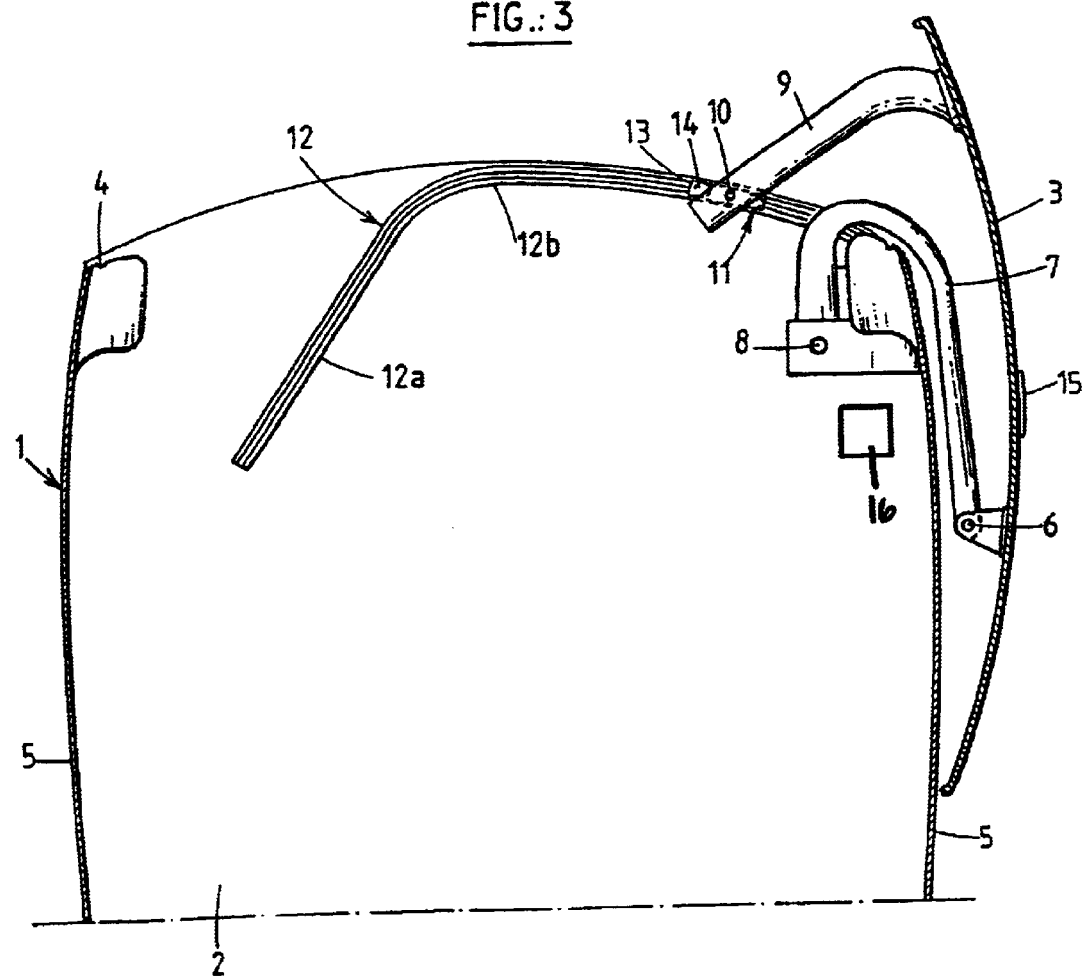

HINGE SYSTEM FOR MOTOR VEHICLE BOOT LID COMPRISING AN ARTICULATED ARM AND A SLIDING ARM

The invention relates to a motor-vehicle trunk door equipped with a novel hinge system provided with an articulated arm and a sliding arm.

Most motor-vehicle trunk doors are equipped with hinges articulated on substantially horizontal pins, and they are opened by an upward rotational movement.

There are also known vehicles, generally of the utility type, which are equipped with a sliding door, the door being guided by a pair of lower and upper rails, each cooperating with rollers mounted on an arm, which itself is articulated on the door (European Patent A 401081).

The invention relates to a new hinge system for a motor-vehicle trunk door wherein the trunk door can be moved from closed position to an open position in which it is disposed along a rear fender of the vehicle.

More particularly, the invention relates to a motor-vehicle trunk door articulated at one of the ends of a first arm mounted pivotally at its other end around a vertical lateral pin integral with the chassis, characterized in that it is shifted from a closed position to an open position, substantially perpendicular to the said closed position, by means of the first arm, which has curved shape, and of a second arm, one end of which is fixed to the said door, while the other end is mounted pivotally on a slide (11) mounted in a guide rail.

According to one embodiment, the rail has the shape of an elbow, with a first portion oriented obliquely relative to the plane of symmetry of the vehicle and extending from an interior point of the vehicle floor to a point situated near the middle of the rear of the vehicle, and with a second portion extending from the said rear middle point, substantially parallel to the lower edge of the cutout of the trunk door, toward the side on which the said vertical lateral pin is mounted.

The first arm has curved shape such that, when this arm pivots around its vertical lateral pin, its concave part substantially fits the rear fender of the vehicle body, in the position corresponding to the fully open door.

The function of this arm is to move the trunk door from its closed position to its fully open position, in which the door is disposed along one of the rear fenders of the vehicle. For this purpose the curved arm must be able to pivot by an angle of at least 180°, preferably by about 190 to 200°.

The function of the second arm is to control the kinematics of the door during pivoting of the first arm. In the absence of this second arm, the door, which is articulated at the other end of the first arm opposite the pivoting pin thereof, could be oriented in undesirable manner and, in particular, could bump against the rear fender of the vehicle.

To this end, the second arm has such a length and the guide rail has such a shape that, during the initial stage of opening of the door, they cause the door to be shifted mainly in a direction substantially transverse to itself, after which they then make the door turn by about 90° to ensure that it will be aligned along one of the rear fenders of the vehicle without damaging the vehicle body.

The door can be opened and closed manually or else by means of an electric motor, which ensures pivoting of the curved arm around its lateral vertical pin integral with the chassis.

The present invention will be better understood from the description hereinafter, provided with reference to the attached drawings.

FIGS. 1, 2 and 3 are schematic views illustrating a trunk door equipped with a hinge system according to the invention in closed position, in slightly open position and in fully open position respectively.

In these figures there is illustrated the rear part of a motor vehicle 1 having a chassis 2. For clarity of illustration, the vehicle roof and the interior fittings (seats, floor) have been omitted. This vehicle is provided with a trunk door 3 of curved shape which, in closed position, is received in a cutout 4. As regards the body, only the rear fenders 5 are illustrated. At its lower part, where it is articulated on a vertical pin 6, door 3 is connected to one of the ends of a curved arm 7, whose other end is mounted pivotally around a vertical lateral pin 8 integral with chassis 2 or with a member integral with this chassis. The point of articulation of arm 7 on door 3 is situated approximately in the left third of the width of the door.

The lower part of door 3 is also connected, close to its right edge, in fixed manner, to one of the ends of a second arm 9, whose other end is mounted pivotally around a vertical pin 10, which is itself carried by a slide 11 capable of sliding in a rail 12 fixed to the vehicle chassis. Slide 11 can comprise, for example, a support 13 carrying pin 10 and mounted on rollers 14 that ensure sliding in the rail. Rail 12 has the shape of an elbow, with a first portion 12a, which is oriented obliquely (at 45° for example) relative to the plane of symmetry of the vehicle and which extends from an interior point of the vehicle floor to an elbow 12b situated near the middle of the rear of the vehicle, and with a second portion 12c, which extends from the said elbow, substantially parallel to the lower edge of cutout 4 of the door and toward the side on which pin 8 is mounted.

In closed position, slide 11 is situated at the end of portion 12a opposite elbow 12b, as illustrated in FIG. 1.

The door is opened by pulling on handle 15 of the lock integrated in the door, with the effect of first releasing the lock and then causing the door, in a first phase, to be shifted in a direction substantially perpendicular to itself; this shift results from the fact that curved arm 7 pivots clockwise around vertical pin 8 and that arm 9 causes the door to pivot counterclockwise around vertical pin 10, the end of arm 9 opposite the door being subjected to displacement along a path determined by rail 12. FIG. 2 illustrates one of the open positions during this first phase. This first opening phase is complete when slide 11 arrives at elbow 12b of the rail. From that moment on, the combined actions of arms 7 and 9 cause the door to undergo a rotation around itself by about 90° which, in combination with the pivoting action of curved arm 7, causes the door finally to become aligned along the left rear vehicle fender, without touching it, as illustrated in FIG. 3.

In an alternative embodiment, the door could be opened by means of an electric motor 16 that drives the pivoting arm 7 and that is actuated by a control button provided on a control panel.

The door is closed by inverting the movements of the opening process.

In an alternative embodiment, not illustrated, the hinge system for a vehicle trunk door according to the invention can be integrated with a door that can cooperate, via its end section closest to second arm 9, with a second door. The two doors form a device that blocks the cutout giving access to the trunk.

The blocking device can be provided with two doors equipped with the hinge system according to the invention or with one door equipped with the hinge system according to the invention plus one swinging door articulated around at least one vertical pin. To improve the kinematics of the doors of such a device, especially the independence of opening of each door relative to the other door, the end of first portion 12a of rail 12 not connected to elbow 12b must be oriented obliquely, at an angle greater than 45°, relative to the plane of symmetry of the vehicle. As an example, this end can be oriented substantially parallel to the lower edge of the cutout, for example at an angle on the order of 80° relative to the plane of symmetry of the vehicle. Thus, at the beginning of the first opening phase, the door is caused to shift in a direction substantially parallel to itself and then in a direction substantially perpendicular to itself, as seen hereinabove.

The invention is of course not limited to the described and illustrated embodiments, which are provided by way of illustrative and non-limitative examples.

What is claimed is:

1. A motor-vehicle trunk door articulated on one of ends of a first arm mounted pivotally at another end around a vertical lateral pin integral with a chassis, wherein the trunk door is shifted from a closed position to an open position, substantially perpendicular to the closed position, by the first arm, which has a curved shape, and by a second arm, a first end of the second arm being fixed to the door, while a second end of the second arm being mounted pivotally on a slide mounted in a guide rail.

2. A trunk door according to claim 1, wherein the guide rail has a shape of an elbow, with a first portion oriented obliquely relative to a plane of symmetry of a vehicle and extending from an interior point of a floor of the vehicle to a point situated near a rear middle point of a rear of the vehicle, and with a second portion extending from the rear middle point, substantially parallel to a lower edge of a cutout of the trunk door, toward a side on which the vertical lateral pin is mounted.

* * * * *